US006266071B1

United States Patent
Stam et al.

(10) Patent No.: US 6,266,071 B1
(45) Date of Patent: Jul. 24, 2001

(54) METHOD OF PRODUCING FLUID-LIKE ANIMATIONS USING A RAPID AND STABLE SOLVER FOR THE NAVIER-STOKES EQUATIONS

(75) Inventors: Jos Stam, Seattle, WA (US); Duncan Brinsmead, Ontario (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/196,754

(22) Filed: Nov. 20, 1998

(51) Int. Cl.$^7$ .................................................... G06F 15/00
(52) U.S. Cl. ............................................................. 345/473
(58) Field of Search ..................................... 345/418, 419, 345/473, 474, 475, 133, 134

(56) References Cited

U.S. PATENT DOCUMENTS 5,949,424 * 9/1999 Cabral et al. ......................... 345/426

OTHER PUBLICATIONS

Chen, J.X. et al., "Real–Time Fluid Simulation in a Dynamic Virtual Environment," *IEEE Computer Graphics and Applications*, vol. 17, No. 3, May–Jun. 1997, pp. 52–61.

Foster, N. and Metaxas, D., "Modeling the Motion of a Hot, Turbulent Gas," *Computer Graphics Proceedings, Annual Conference Series*, 1997, pp. 181–188.

Foster, N. and Metaxas, D., "Realistic Animation of Liquids," *Graphical Models and Image Processing*, vol. 58, No. 5, Sep. 1996, pp. 471–483.

* cited by examiner

*Primary Examiner*—Phu K. Nguyen
(74) *Attorney, Agent, or Firm*—Sterne, Kessler, Goldstein & Fox p.l.l.c.

(57) ABSTRACT

The present invention is a method for performing computer graphic simulation of a fluid in motion. The method takes input data and calculates the velocity of the fluid at a plurality of points at successive time intervals. The velocity values are sent to an animator module which produces a geometrical description of the scene. This geometrical description is then sent to a renderer module, which calculates an image using the geometrical description. The animation is then displayed on an output device. In an embodiment of the invention, scalar quantities such as temperature and density are calculated as well and sent to the renderer module, where they are used in calculating the image. The process of calculating velocity and scalar fields comprises solution of the Navier-Stokes equations, is easy to implement, and allows a user to interact in real-time with three-dimensional fluids on a graphics workstation. The invention achieves this by using time-steps much larger than the ones used by conventional techniques, thus obtaining a stable solver for these equations.

12 Claims, 4 Drawing Sheets

METHOD OF PRODUCING FLUID-LIKE ANIMATIONS USING A RAPID AND STABLE SOLVER FOR THE NAVIER-STOKES EQUATIONS

BACKGROUND OF THE INVENTION

1. Field of the Invention

The present invention relates generally to computer graphic animation, and more particularly to computer graphic simulation of fluid flow.

2. Related Art

One of the most intriguing problems in computer graphics is the simulation of fluid like behavior. Fluid mechanics is used as the standard mat hematical framework on which many existing simulations are based. There is a consensus among scientists that the Navier-Stokes equations are a very good model for fluid flow. Thousands of books and articles have been published in various areas on how to compute these equations numerically. Which solver to use depends largely on the problem at hand and on the computing power available. Most engineering tasks require that the simulation provide accurate bounds on the physical quantities involved, to answer questions such as "will the plane fly?" or "will the heat cause a fire?" The exact shape of the flow is of secondary importance. In computer graphics, on the other hand, attributes such as the shape and the behavior of the fluid are of primary interest, while physical accuracy is secondary or in some cases irrelevant. Fluid solvers, for computer graphics, should ideally provide a user with a tool that achieves fluid-like effects in real-time.

In fact, most previous fluid models in computer graphics are driven by visual appearance and not by physical accuracy. A good example is the cloud model of Gardner (Gardner, G. Y., "Visual Simulation of Clouds", *ACM Computer Graphics (SIGGRAPH '85)* 19(3):297–384 (July 1985)). More generally, researchers in computer graphics have used solid textures to model various fluid-like phenomena. This type of research was pioneered by Perlin (Perlin, K., "An Image Synthesizer", *ACM Computer Graphics (SIGGRAPH '85)* 19(3):287–296 (July 1985)) and later extended by Ebert and Parent to include motion (Ebert, D. S. and Parent, R. E., "Rendering and Animation of Gaseous Phenomena by Combining Fast Volume and Scanline A-buffer Techniques", *ACM Computer Graphics (SIGGRAPH '90)* 24(4):357–366 (August 1990)). A very good exposition of this approach and a comprehensive account of related models is given in the book on solid texturing by Ebert, Musgrave and Peachy (Ebert, D., et al., *Texturing and Modeling: A Procedural Approach*, AP Professional (1994)). Another approach to the modeling of fluids is the use of particle systems as initiated by Reeves (Reeves, W. T., "Particle Systems. A Technique for Modeling a Class of Fuzzy Objects", *ACM Computer Graphics (SIGGRAPH '83)* 17(3):359–376 (July 1983)) and refined by Sims (Sims, K., "Particle Animation and Rendering Using Data Parallel Computation", *ACM Computer Graphics (SIGGRAPH '90)* 24(4):405–413 (August 1990)). Using variants of these techniques, visual simulations have been designed for various phenomena such as smoke (Sakas, G., "Modeling and Animating Turbulent Gaseous Phenomena Using Spectral Synthesis", *The Visual Computer* 9:200–212 (1993); Stam, J. and Fiume, E., "Turbulent Wind Fields for Gaseous Phenomena", in: *Proceedings of SIGGRAPH '93*, pages 369–376, Addison-Wesley Publishing Company (August 1993)), water (Chiba, N., et al., "Visual Simulation of Water Currents Using a Particle-based Behavioural Model", *The Journal of Visualization and Computer Animation* 6:155–171 (1995)) and fire (Chiba, N., et al., "Two-dimensional Visual Simulation of Flames, Smoke and the Sprad of Fire", *The Journal of Visualization and Computer Animation* 5:37–53 (1994); Stam, J. and Fiume, E., "Depicting Fire and Other Gaseous Phenomena Using Diffusion Processes", in: *Proceedings of SIGGRAPH '95*, pages 129–136, Addison-Wesley Publishing Company (August 1995)). To obtain convincing fluid motions with these techniques usually requires considerable user expertise and trial and error. On the other hand, methods based on the Navier-Stokes equations should necessarily produce fluid-like results, since the underlying physics of fluids is properly modeled by these equations.

Until recently, it was believed that the full Navier-Stokes equations were too difficult to be solved in practice for computer graphical applications. However, Foster and Metaxas have shown that the full solution of the Navier-Stokes even on coarse grids can be used to create very nice simulations of gases and water (Foster, N. and Metaxas, D., "Modeling the Motion of a Hot, Turbulent Gas", in: *Computer Graphics Proceedings, Annual Conference Series 1997*, pages 181–188 (August 1997); Foster, N. and Metaxas, D., "Realistics Animation of Liquids", *Graphical Models and Image Processing* 58(5):471–483 (1996)). Before that, the Navier-Stokes equations had only been computed by supercomputers to animate two-dimensional fluids, such as Jupiter's atmosphere (Yaeger, L. and Upson, C., "Combining Physical and Visual Simulation. Creation of the Planet Jupiter for the film 2010", *ACM Computer Graphics (SIGGRAPH '86)* 20(4):85–93 (August 1986)). Also, a linearized version of the Navier-Stokes equations was used by Kass and Miller to derive a stable solver (Kass, M. and Miller, G., "Rapid, Stable Fluid Dynamics for Computer Graphics", *ACM Computer Graphics (SIGGRAPH '90)* 24(4):49–57 (August 1990)), but the linearization removes most of the fluid-like behavior, such as swirling and turbulence. Foster and Metaxas' work on the other hand clearly shows the advantages of using the full Navier-Stokes equations. Many effects which are hard to key frame manually such as swirling motion and flows past objects are obtained. Their algorithm is based mainly on the work of Harlow and Welch in computational fluid dynamics, which dates back to 1965 (Harlow, F. H. and Welch, J. E., "Numerical Calculation of Time-Dependent Viscous Incompressible Flow of Fluid with Free Surface", *The Physics of Fluids* 8:2182–2189 (December 1965)). Since then many other techniques have been developed which Foster and Metaxas could have used. However, their model has the advantage of being simple to code, since it is based on a straightforward finite differencing of the Navier-Stokes equations and an explicit time solver.

The main problem with their approach is that the numerical scheme can become unstable for large time-steps or very viscous fluids. Instability leads to numerical simulations that yield numerically unbounded results, and therefore have to be restarted with a smaller time-step. The instability of their algorithm sets serious limits on the interactivity of their model. Ideally, a user should be able to interact in real-time with a fluid solver without having to worry about possible instability. Hence there is a need for a method of simulating fluid-like behavior based on the Navier Stokes equations, where solution of the equations is stable.

SUMMARY OF THE INVENTION

The present invention is a method for performing computer graphic simulation of a fluid in motion. The method takes input data and calculates the velocity of the fluid at a plurality of points at successive time intervals. The velocity values are sent to an animator module which produces a geometrical description of the scene. This geometrical description is then sent to a renderer module, which calculates an image using the geometrical description. The animation is then displayed on an output device. In an embodiment of the invention, scalar quantities such as temperature and density are calculated as well and sent to the renderer module, where they are used in calculating the image.

The process of calculating velocity and scalar fields comprises solution of the Navier-Stokes equations, is easy to implement, and allows a user to interact in real-time with three-dimensional fluids on a graphics workstation. The invention achieves this by using time-steps much larger than the ones used by Foster and Metaxas. To obtain a stable solver for these equations, the invention radically departs from Foster and Metaxas' method of solution. Instead of their explicit Eulerian schemes, Lagrangian and implicit methods are used in the present invention to solve the Navier-Stokes equations. While this process would not be accurate enough for most engineering applications, it is accurate enough to produce most of the interesting visuals commonly associated with fluid flows.

BRIEF DESCRIPTION OF THE FIGURES

The foregoing and other features and advantages of the invention will be apparent from the following, more particular description of a preferred embodiment of the invention, as illustrated in the accompanying drawings.

The preferred embodiment of the invention is now described with reference to the figures where like reference numbers illustrate like elements. In the figures, the left most digit of each reference number corresponds to the figure in which the reference number is first used.

DETAILED DESCRIPTION OF THE PREFERRED EMBODIMENTS

I. Overview

The sections below present the Navier-Stokes equations and the derivation which leads to the claimed method. Since the solution relies on sophisticated mathematical techniques, it is presented in mathematical physics terms which should be familiar to computer graphics researchers of ordinary skill in the area of physics-based modeling. The necessary background for the description that follows is available in books by A. J. Chorin and J. E. Marsden (*A Mathematical Introduction to Fluid Mechanics*, Springer-Verlag, Texts in Applied Mathematics 4, Second Edition, New York (1990)) and M. B. Abbott (*Computational Fluid Dynamics: An Introduction for Engineers*, Wiley, New York (1989)). Also, Foster and Metaxas' paper introduces the concepts from fluid dynamics to the computer graphics community.

The animation method entails simulation of fluid flow, where the flow is modeled by a numerical solution of the Navier Stokes equations. The person developing the animation must first define a grid. The grid represents the volume in space through which the fluid flows. Each cell of the grid represents a discrete unit volume, or voxel, for which the velocity vector of the fluid in that cell is calculated. Velocity in any given cell is calculated by applying the Navier Stokes solver described below. The solver takes the velocity at an initial point in time t, then adds the effects of external force, advection, and diffusion over an interval $\Delta t$ to determine velocity at time $t+\Delta t$. Iterating this calculation over time in each cell leads to the desired simulation of fluid flow in the overall grid volume. As will be described below, this process can be extended to model the propagation of heat and matter (e.g., dust or smoke) through the fluid, in addition to changes in velocity.

A. Environment of the Present Invention

Figure 1:
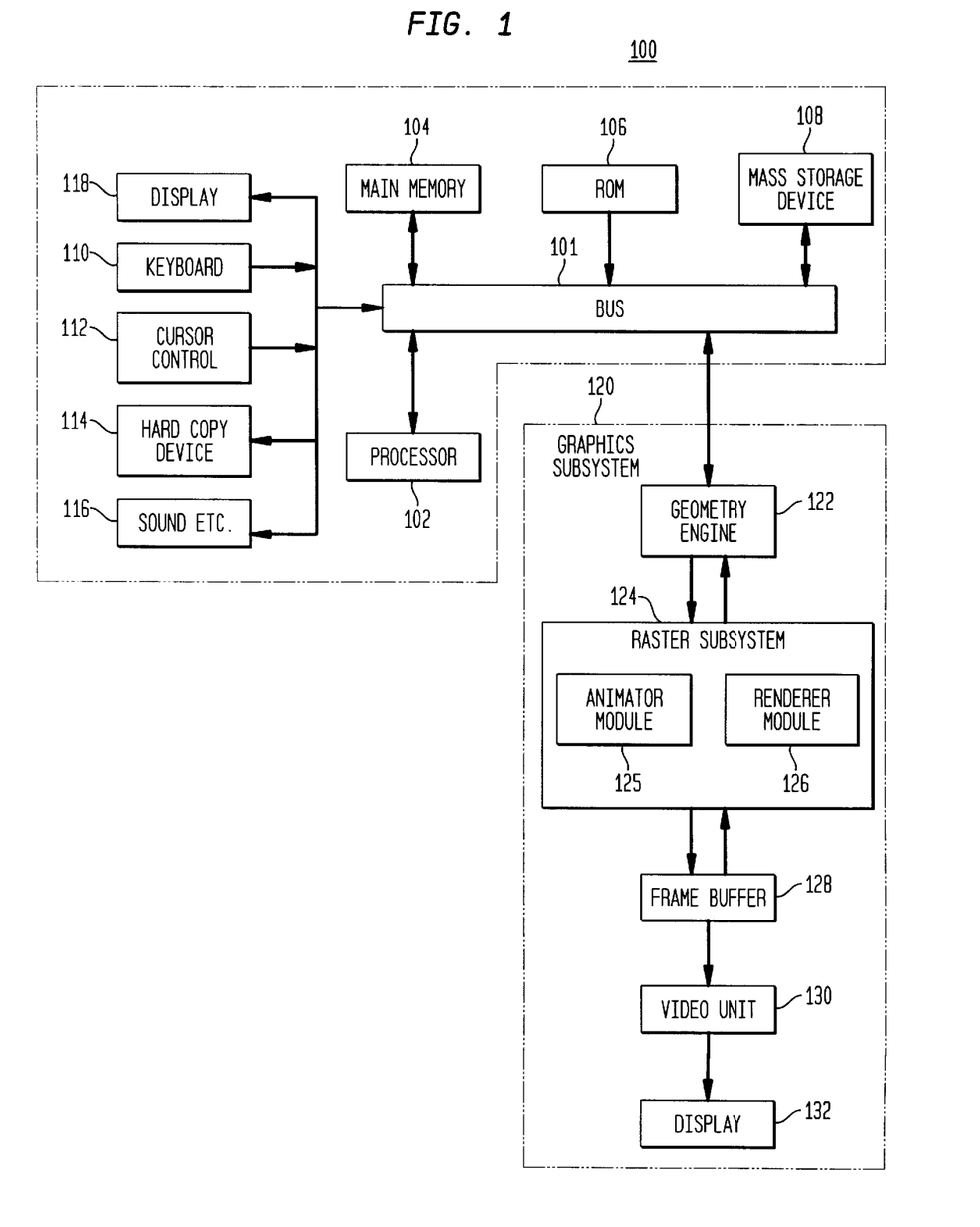
FIG. 1 is a high level block diagram of a computer system used to implement an embodiment of the present invention.

Referring to FIG. 1, a block diagram of a computer graphics display system 100 is shown. System 100 is exemplary only and it is not intended that the invention be limited to application in this example environment. In fact, after reading the following description, it will become apparent to a person skilled in the relevant art how to implement the invention in alternative environments. System 100 drives a graphics subsystem 120 for generating images according to the present invention. In a preferred embodiment, the graphics subsystem 120 is utilized as a high-end, interactive computer graphics workstation.

System 100 includes a host processor 102 coupled through a data bus 101 to a main memory 104, read only memory (ROM) 106, and a mass storage device 108. Mass storage device 108 is used to store a vast amount of digital data relatively cheaply. For example, the mass storage device 108 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 102 for the benefit of an interactive user. An alphanumeric keyboard 120 and a cursor control device 112 (e.g., a mouse, trackball, joystick, etc.) are used to input commands and information. The output devices include a hard copy device 114 (e.g., a laser printer) for printing data or other information onto a tangible medium. A sound recording or video option 116 and a display screen 118 can be coupled to the system 100 to provide for multimedia capabilities.

Graphics data is provided from processor 102 through data bus 101 to the graphics subsystem 120. The graphics subsystem 120 includes ageometry engine 122, a raster subsystem 124 coupled to an animator module 125 and a renderer module 126, a frame buffer 128, video board 130, and display 132.

The present invention is preferably implemented using software executing in an environment similar to that described above with respect to FIG. 1. In this document, the term "computer program product" is used to generally refer to a removable storage device (not shown), mass storage device 108 or ROM 106. Computer programs (also called computer control logic) are stored in the removable storage device, ROM 106, or mass storage device 108. Such computer programs, when executed, enable the computer system 100 to perform the features and functions of the present invention as discussed herein. Accordingly, such computer programs represent controllers of the computer system 100.

B. Apparatus Overview

Figure 2:
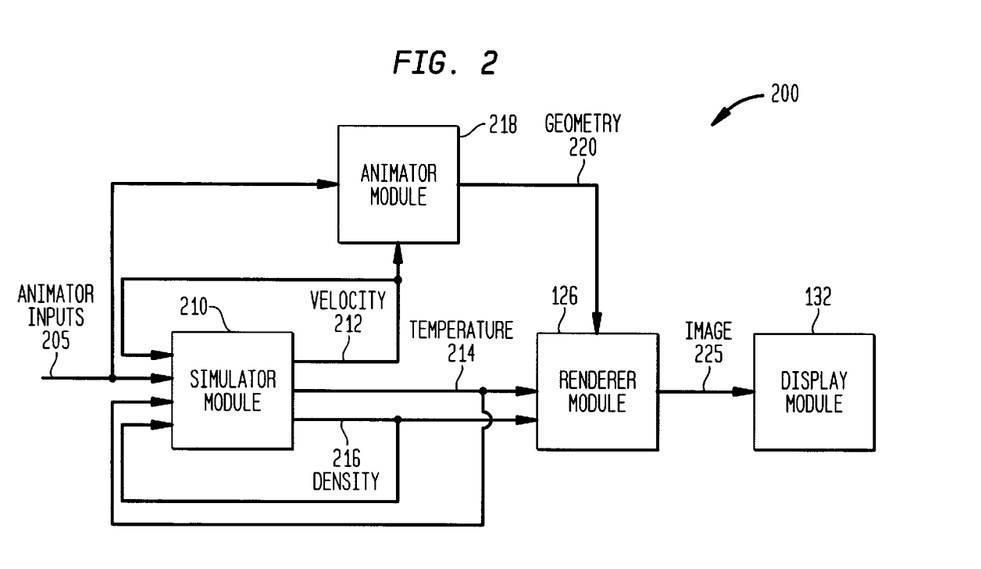
FIG. 2 is a high level block diagram of a simulator, animator, renderer, and display modules, according to an embodiment of the invention.

FIG. 2 illustrates the present invention as a system 200. An animator inputs a variety of data 205, necessary for solution of the Navier-Stokes equations, into a simulator module 210. In an embodiment of the invention, animator inputs 205 may also be sent to an animator module 218 in order to control the ultimate animation. The animator inputs 205 are described in greater detail in Section I.C. below. Simulator module 210 numerically solves the equations to determine fluid velocity at multiple points in the simulated fluid, and at successive time intervals. Simulator module 210 outputs the resulting velocity values 212 to animator module 218. Animator module 218 uses velocity values 212 to produce a geometrical description of the scene 220, which is sent to renderer module 126. In an embodiment of the invention, the animator inputs 205 will also include data sufficient to allow simulator module 210 to solve for temperature values at the same points in the simulated fluid and at the same time intervals as in the velocity case. The resulting temperature values 214 are then sent to renderer module 126. Analogously, system 200 may also include means by which simulator module 210 can calculate the density of a substance introduced into the simulated fluid. As before, such calculations would be based on appropriate animator inputs 205 and would result in density values 216, which are then sent to renderer 126. In an embodiment of the invention (not shown), temperature values 214 and density values 216 may also be sent from the simulator module 210 to the animator module 218, where they could be used to generate the geometrical description 220.

Note that velocity values 212, temperature values 214, and density values 216 are generated for a point in time t in the animation, and are fed back to the simulator module 210. As will be described in greater detail in Section I.C., these values are used to produce velocity, temperature, and density values, respectively, for the animation's next point in time t+Δt.

Based on all its inputs, renderer module 126 produces an image 225 that is displayed on a display device 230. In a preferred embodiment, renderer module 126 actively queries simulator module 210 for data. For example, renderer module 126 may request from simulator module 210 all object states for a frame.

The present invention contemplates two modes of rendering. The first mode uses graphics subsystem 120. An exemplary graphics engine that can implement the present invention is a Reality Engine available from Silicon Graphics, Mountain View, Calif. The first mode of operation allows real-time display. The second mode of operation does not require a graphics engine. Rather, the renderer is executed as a batch process. This is performed by, for example, processor 102.

C. Process Overview

Figure 3:
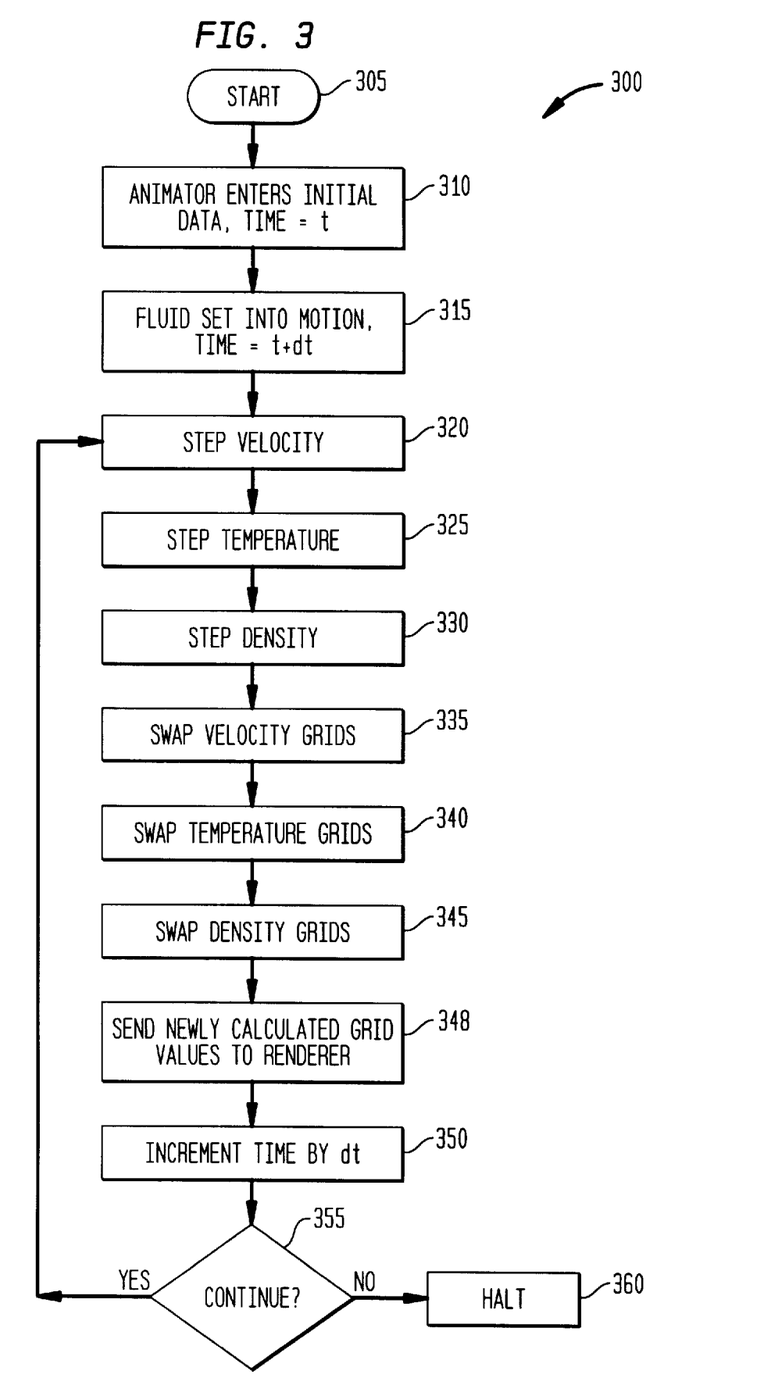
FIG. 3 illustrates the solution process for the Navier Stokes equations as incorporated in the simulation process, according to an embodiment of the invention.
Figure 4A:
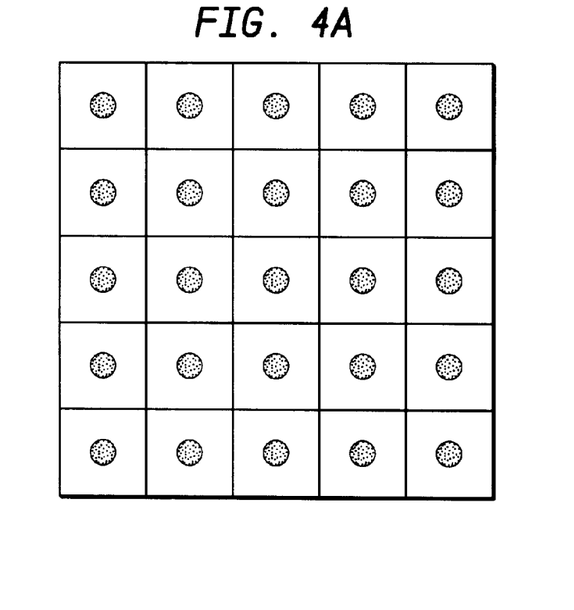
FIG. 4 illustrates the grids used by the solver to model a volume of fluid, according to an embodiment of the invention.
Figure 4B:
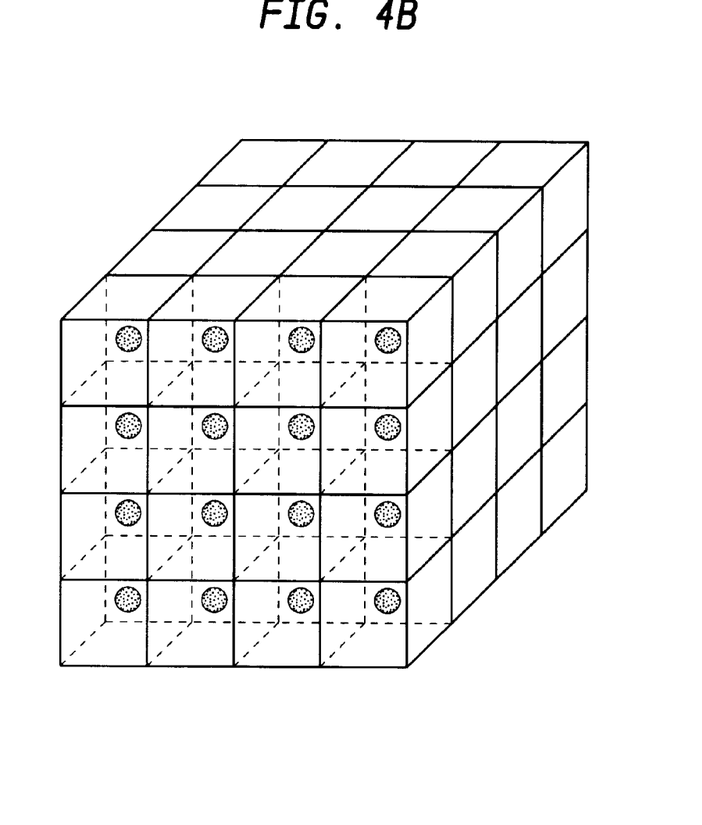

An embodiment of this process is illustrated in FIG. 3. In step 310 the animator inputs the data required to solve the Navier-Stokes equations with respect to velocity, temperature, and density. This includes an initial velocity for each cell in a velocity grid at a time t. Similarly, the animator inputs an initial temperature for each cell in a temperature grid, and provides an initial density for each cell in a density grid at a time t. In addition, the animator includes a definition of a grid data structure in either two dimensions (if the simulation is to be two-dimensional) or three (if the simulation is to be three-dimensional). These grids are illustrated in FIGS. 4A and 4B. The grid defined by the animator represents the volume through which the fluid flows, and is composed of equally sized cells. For reasons that will be explained below, two copies of the grid are maintained for each of the three attributes, velocity, temperature, and density.

In step 315, the simulation is set into motion, either by the animator or by the simulator module. In step 320, a new velocity value is determined for each cell at a point in time t+dt, using the animator input and the velocity values from time t. The new velocity values are assigned to their appropriate locations in the companion velocity grid. In steps 325 and 330, new values for temperature and density, respectively, are likewise determined for each cell for the point in time t+dt. The new temperature and density values are assigned to their appropriate locations in the companion temperature and density grids, respectively.

In step 335, the velocity grids are swapped. This serves to place the new velocity values in the grid that formerly held the old velocity values. In step 340 an analogous swap takes place between the temperature grids; in step 345 an analogous swap takes place between the density grids. After the time coordinate is incremented again by dt in step 350, new updated values are calculated for velocity, temperature, and density, based on the previous values retained in the respective grids. The process iterates, continually calculating new velocity, temperature, and density values based on previous values. As long as the simulation continues, the new values are provided to the renderer module for production of successive animation frames (step 348).

II. A Stable Solution to the Navier-Stokes Equations

The following sections describe the Navier-Stokes equations and the method of solution incorporated in the present invention. Solution of the Navier-Stokes velocity equations constitutes a fluid velocity function, where velocity is a function of time. Temperature and density functions can likewise be obtained.

A. Basic Equations

The Navier-Stokes equations are presented below, along with the simplifying assumptions and manipulations that lead to a stable solver. The most basic fluid simulation is one where temperature and density are approximately constant. This is a reasonable assumption, for many fluids are found to be so in practice. The more general case of fluids with varying temperature will be considered below, once the results for an isothermic fluid are derived. A fluid with constant density and temperature is entirely described by two fields: a velocity field u and a pressure field p. These quantities generally vary both in space and in time, and depend on the boundaries surrounding the fluid. The spatial coordinate is denoted by x, which for two-dimensional fluids is x=(x, y) and for three-dimensional fluids is equal to (x, y, z). Given that the velocity and the pressure are known for some initial time t=0, then the evolution of these quantities over time is given by the Navier-Stokes equations (Chorin, A. J. and Marsden, J. E., *A Mathematical Introduction to Fluid Mechanics*, Springer-Verlag, Texts in Applied Mathematics 4, Second Edition, New York (1990)):

$$\nabla \cdot u = 0 \quad (1)$$

$$\frac{\partial u}{\partial t} = -(u \cdot \nabla)u - \frac{1}{\rho}\nabla p + v\nabla^2 u + f \quad (2)$$

where v is the kinematic viscosity of the fluid, p is its density and f is an external force. Some readers might be unfamiliar with this compact version of the Navier-Stokes equations. Eq. 2 is a vector equation for the three (two in two-dimensions) components of the velocity field. The "·" denotes a dot product between vectors, while the symbol $\nabla$ is the vector of spatial partial derivatives. More precisely, $\nabla=(\partial/\partial x, \partial/\partial y)$ in two-dimensions and $\nabla=(\partial/\partial x, \partial/\partial y, \partial/\partial z)$ in three-dimensions. The shorthand notation $\nabla^2=\nabla\cdot\nabla$ is also used. The actual derivation of the Navier-Stokes equations is well known in the art.

These equations also have to be supplemented with boundary conditions. Two types of boundary conditions are useful in practical applications: periodic boundary conditions and fixed boundary conditions. In the case of periodic boundaries the fluid is defined on an n-dimensional torus (n=2, 3). In this case there are no walls, just a fluid which wraps around. Although such fluids are not encountered in practice, they are very useful in creating evolving texture maps. Also, these boundary conditions lead to an elegant implementation that uses the fast Fourier transform as shown below in Section II.C. Fixed boundary conditions occur when the fluid exists in some bounded domain D. In that case, the boundary conditions are given by a function $u_D$ defined on the boundary $\partial D$ of the domain. See Foster and Metaxas' work for a discussion of these boundary conditions in the case of a hot fluid (Foster, supra). Note that the boundary conditions should be such that the normal component of the velocity field is zero at the boundary: no matter should traverse walls.

The pressure and the velocity fields which appear in the Navier-Stokes equations are related. A single equation for the velocity can be obtained by combining Eq. 1 and Eq. 2. The steps that lead to that equation are fundamental to the invention and are outlined below. See Chorin and Marsden's treatment of the subject (Chorin, supra at 36ff). An important mathematical result states that any vector field w can be uniquely decomposed into the form:

$$w = u + \nabla q, \quad (3)$$

where u has zero divergence: $\nabla \cdot u = 0$ and q is a scalar field. Any vector field is the sum of a mass conserving field and a gradient field. This result allows us to define an operator P which projects any vector field w onto its divergence free part u=Pw. The operator is in fact defined implicitly by multiplying both sides of Eq. 3 by "$\nabla \cdot$":

$$\nabla \cdot w = \nabla^2 q. \quad (4)$$

This is a Poisson equation for the scalar field q. A solution to this equation is used to compute the projection u:

$$u = Pw = w - \nabla q.$$

If this projection operator is applied on both sides of Eq. 2, a single equation for the velocity is obtained:

$$\frac{\partial u}{\partial t} = P(-(u \cdot \nabla)u + v\nabla^2 u + f) \quad (5)$$

using the fact that Pu=u and P$\nabla$p=0. This is the fundamental equation from which a stable fluid solver has been developed. The operator P represents a projection step performed on a vector defined with three terms. The term $-(u \cdot \nabla)u$ represents the effect of advection on the fluid. The term $v\nabla^2 u$ represents the effect of viscosity (or, equivalently, diffusion). The term f represents the effect of an external force on the fluid.

B. Method of Solution

Eq. 5 is solved from an initial state $u_0=u(x, 0)$ by moving through time with a time step $\Delta t$. Let us assume that the field has been resolved at a time t, and that the field must now be resolved at a later time t+$\Delta t$. Eq. 5 is resolved over the time span $\Delta t$ in four steps. Starting from the solution $w_0(x)=u(x, t)$ of the previous time step, each term on the right hand side of Eq. 5 is then sequentially resolved. This is followed by a projection onto the divergent free fields. The steps are:

$$w_0(x) \xrightarrow{\text{add force}} w_1(x) \xrightarrow{\text{advect}} w_2(x) \xrightarrow{\text{diffuse}} w_3(x) \xrightarrow{\text{project}} w_4(x).$$

The solution at time t+$\Delta t$ is then given by the last velocity field: $u(x, t+\Delta t)=w_4(x)$. A simulation is obtained by iterating these steps. The detailed computation of each step is described below.

The easiest term to solve is the addition of the external force f, the last term in the vector projected in Eq. 5. Assuming that the force does not vary considerably during the time step, then $$w_1(x)=w_0(x)+\Delta t\, f(x, t),$$

is a good approximation to of effect of the force on the field over the time step $\Delta t$. In an interactive system this is a good approximation, since forces are only applied at the beginning of each time step.

The next step accounts for the effect of advection (or convection) of the fluid on itself. A disturbance somewhere in the fluid propagates according to the expression $-(u \cdot \nabla)u$, the first term in the vector projected in Eq. 5. This term makes the Navier-Stokes equations non-linear. Foster and Metaxas resolved this component using finite differencing. Their method is stable only when the time step is sufficiently small such that $\Delta t < \Delta \tau / |u|$, where $\Delta \tau$ is the spacing of their computational grid. Therefore, for small separations and/or large velocities, very small time steps have to be taken. On the other hand, the present invention uses a different approach and results in an unconditionally stable solver. No matter how big the time step is, simulations performed by the present invention will never become unstable. This method is based on a technique to solve partial differential equations known as the method of characteristics. This method is of crucial importance to the stable solver, and in well known in the field of partial differential equations. The method is summarized here.

The method of characteristics can be used to solve advection equations of the type $$\frac{\partial a(x, t)}{\partial t} = -v(x) \cdot \nabla a(x, t) \quad \text{and} \quad a(x, 0) = a_0(x),$$

where a is a scalar field, v is a steady vector field and $a_0$ is the field at time t=0. Let $p(X_0, t)$ denote the characteristics of the vector field v which flow through the point $X_0$ at t=0:

$$\frac{d}{dt}p(x_0, t) = v(p(x_0, t)) \quad \text{and} \quad p(x_0, t) = x_0.$$

Now let $(x_0, t)=a(p(x_0, t), t)$ be the value of the field along the characteristic passing through the point $x_0$ at t=0. The variation of this quantity over time can be computed using the chain rule of differentiation:

$$\frac{d\bar{a}}{dt} = \frac{\partial a}{\partial t} + u \cdot \nabla a = 0.$$

This shows that the value of the scalar does not vary along the streamlines. In particular, $(x_0, t)=(x_0, 0)=a_0(x_0)$. Therefore, the initial field and the characteristics entirely define the solution to the advection problem. The field for a given time t and location x, is computed by first tracing the location x back in time along the characteristic to get the point $x_0$, and then evaluating the initial field at that point:

$$a(p(x_0,t),t)=a_0(x_0)$$

This method is used to solve the advection equation over a time interval $[t, t+\Delta t]$ for the fluid. In this case, $v=u(x, t)$ and $a_0$ is any of the components of the fluid's velocity at time t.

The method of characteristics can also be understood intuitively. At each time step, all the fluid particles are moved by the velocity of the fluid itself. Therefore, to obtain the velocity at a point x at the new time $t+\Delta t$, the point x is backtraced through the velocity field $w_1$ over a time $\Delta t$. This defines a path $p(x, s)$ corresponding to a partial streamline of the velocity field. The new velocity at the point x is then set to the velocity that the particle, now at x, had it its previous location a time $\Delta t$ ago:

$$w_2(x)=w_1(p(x,-\Delta t)).$$

This method has several advantages. Most importantly, it is unconditionally stable. Indeed, from the above equation note that the maximum value of the new field is never larger than the largest value of the previous field. Second, the method is very easy to implement. All that is required in practice is a particle tracer and a linear interpolator, described below in Section III.B.). Versions of the method of characteristics have been used by other researchers to move textures and densities of gases through precomputed velocity fields. The application was either employed in visualizing flow fields (Max, N., et al., "Visualizing Wind Velocities by Advecting Cloud Textures", in *Proceedings of Visualization '92*, pages 179–183, Los Alamitos, Calif., IEEE CS Press (October 1992); Sims, K., "Choreographed Image Flow", *The Journal Of Visualization And Computer Animation* 3:31–43 (1992)) or improving the rendering of gas simulations (Stam, J. and Fiume, E., "Depicting Fire and Other Gaseous Phenomena Using Diffusion Processes", Ebert, D. S., et al., "Solid Spaces and Inverse Particle Systems for Controlling the Animation of Gases and Fluids", *The Visual Computer* 10:471–483 (1994)). The present application of the technique is fundamentally different, since it is used to update the velocity field, which previous researchers have not dynamically animated.

The third step solves for the effect of viscosity and is equivalent to a diffusion equation:

$$\frac{\partial w_2}{\partial t} = \nu \nabla^2 w_2.$$

This is a standard equation for which many numerical procedures have been developed. This expression corresponds to the second term of the vector projected in Eq. 5. The most straightforward way of solving this equation is to discretize the diffusion operator $\nabla^2$ and then to do an explicit time step. However, this method is unstable when the viscosity is large. An implicit method is therefore used:

$$(I-\nu\Delta t\nabla^2)w_3(x)=w_2(x),$$

where I is the identity operator. When the diffusion operator is discretized, this leads to a sparse linear system for the unknown field $w_3$. Solving such a system can be done efficiently, however (see below).

The fourth step involves the projection step, which makes the resulting field divergence free. This is represented in Eq. 5 as the operation P. As pointed out in the previous subsection this involves the resolution of the Poisson problem defined by Eq. 4:

$$\nabla^2 q=\nabla\cdot w_3 \quad w_4=w_3-\nabla q.$$

The projection step, therefore, requires a good Poisson solver. Foster and Metaxas' solved a similar equation and used a relaxation scheme. Relaxation schemes, though, have poor convergence and usually require many iterations. Foster and Metaxas reported that they obtained good results even after a very small number of relaxation steps. However, since a different method is used to resolve for the advection step, a more accurate method is necessary. Indeed, the method of characteristics is more precise when the field is close to divergent free. More importantly from a visual point of view, the projection step forces the fields to have vortices which result in more swirling-like motions. For these reasons, a more accurate solver for the projection step has been chosen.

The Poisson equation, when spatially discretized, becomes a sparse linear system. Therefore, both the projection and the viscosity steps involve the solution of a large sparse system of equations. Multigrid methods can solve sparse linear systems in linear time (Hackbusch, W., *Multigrid Methods and Applications*, Springer Verlag, Berlin (1985)). Since the advection solver of the present invention is also linear in time, the complexity of the solver is linear in time. This means that if the space is discretized in N voxels, then the process will run in time O(N). Foster and Metaxas' solver has the same complexity. This performance is theoretically optimal since for a complicated fluid any solver has to consult at least each cell of the computational grid. The method of this invention is therefore both fast and stable.

C. Periodic Boundaries and the FFT

When considering a domain with periodic boundary conditions, the solver takes particularly simple form. The periodicity allows us to transform the velocity into the Fourier domain:

$$u(x,t) \rightarrow \hat{u}(k,t).$$

In the Fourier domain the gradient operator "$\nabla$" is equivalent to the multiplication by ik, where $i \sqrt{1}$. Consequently, both the diffusion step and the projection step are much simpler to solve in the Fourier domain. Indeed the diffusion operator and the projection operators in the Fourier domain are $$I - \nu\Delta t\nabla^2 \rightarrow 1 + \nu\Delta tk^2 \quad \text{and}$$

$$Pw \rightarrow \hat{P}\hat{w}(k) = \hat{w}(k) - \frac{1}{k^2}(k \cdot \hat{w}(k))k.$$

where $k=|k|$. The operator $\hat{P}$ projects the vector (k) onto the plane which is normal to the wave number k. The Fourier transform of the velocity of a divergent free field is therefore always perpendicular to its wavenumbers. The diffusion can be interpreted as a low pass filter whose decay is proportional to both the time step and the viscosity. Hence the solver can be transcribed as follows:

FourierStep ($w_0$, $w_4$, $\Delta t$):
  add force: $w_1=w_0+\Delta tf$
  advect: $w_2(x)=w_1(p(x, -\Delta t))$
  transform: $_2=\text{FFT}\{w_2\}$
  diffuse: $_3(k)=_2(k)/(1+\nu\Delta tk^2)$
  project: $_4=\hat{P}_3$
  transform: $w_4=\text{FFT}^{-1}\{_4\}$ The solver includes the effect of adding an external force to the fluid, as well as the effects of advection and diffusion seen in Eq. 5. It also includes a projection step corresponding to the operator P of Eq. 5.

Since the Fourier transform is of complexity O(N log N), this method is theoretically slightly more expensive than a method of solution relying on multigrid solvers. However, this method is very easy to implement.

D. Adding Heat and Injecting Substances into the Fluid

So far the case of an isothermal fluid which evolves under the influence of an arbitrary external force field f has been considered. A method of computing the motion of the fluid using a stable solver has been described. In general, however, the temperature of a fluid can vary wildly, as in the case of air near a fire or a smoke stack. The temperature is transported by the velocity field, while at the same time the temperature affects the velocity through buoyant forces. Foster and Metaxas modeled the effect of heat on the velocity field through a simple buoyant-like external force $f_{buoy}$, but did not derive it from physical principles. The present invention uses the results of cloud physics (Rogers, R. R., *A Short Course in Cloud Physics,* Pergamon Press, Oxford (1989)). The results are derived for a field within a gravitational field $-gz$, where g is the gravitational constant and the vertical vector $z=(0, 1)$ in two-dimensions and is equal to $(0, 0, 1)$ in three-dimensions. In this case the Navier-Stokes equations for the momentum (Eq. 2) have a single external force equal to $f_{grav}=-gz$. To derive an equation taking into account the effects of heat, the gas-state of the air is considered. The gas-state of the air consists of its density, pressure, and temperature $(\rho, p, T)$. It is assumed that the state is slightly perturbed from a state $(\rho_0, p_0, T_0)$ in hydrostatic equilibrium, for which $p_0$ and $T_0$ are constant and $$p_0 = p_{atm} - h\rho_0 gz,$$

where h is the height above the ground plane h=0 and $P_{atm}$ is the atmospheric pressure at ground level. The perturbation $(\rho p_1, p_1, T_1)$ is assumed to be much smaller than the hydrostatic state:

$$\rho_1 << \rho_0 \; p_1 << p_0 \text{ and } T_1 << T_0.$$

Under these assumptions and from the ideal gas law it can be shown that the gradient of the pressure appearing in the Navier-Stokes Equation is equal to:

$$\frac{1}{\rho}\nabla p = \frac{1}{\rho_0}\nabla p_1 + \left(\frac{p_1}{p_0} - \frac{T_1}{T_0} - 1\right)gz.$$

If this is substituted into the Navier-Stokes Equations (Eq. 2) with a single external gravity force $f=-gz$), then $$\frac{\partial u}{\partial t} = -(u\cdot\nabla)u - \frac{1}{\rho}\nabla p_1 + gz\left(\frac{T_1}{T_0} - \frac{p_1}{p_0}\right) + \upsilon\nabla^2 u.$$

The correct buoyancy force should therefore be:

$$f_{buoy} = gz\left(\frac{T-T_0}{T_0} + \frac{p-p_0}{p_0}\right) \quad (6)$$

where $T_0$ is the ambient temperature, and the pressure p is equal to the solution q of the Poisson problem (Eq. 4), see Chorin, supra. Foster and Metaxas' buoyant force is recovered for the case when the pressure dependant is negligible. In this case their "coefficient of thermal expansion" is proportional to $1/T_0$. Notice that the density of the fluid does not have to be represented, since the temperature and the pressure is computed.

Conversely, the effect of the velocity on the temperature is given by an advection-diffusion equation. Indeed the temperature of a fluid is transported and diffuses over time. Similarly, a non-reactive substance which is injected into the fluid will be advected by it, while diffusing at the same time. Common examples of this phenomenon include the patterns created by milk stirred in coffee or the smoke rising from a cigarette. Let a be either the temperature of the fluid or the density of a substance, then the evolution of this scalar field is given by an advection diffusion equation:

$$\frac{\partial a}{\partial t} = -u\cdot\nabla a + \kappa_a\nabla^2 - \alpha_a a + S_a,$$

where $\kappa_a$ is a diffusion constant, $\alpha_a$ is a dissipation rate and $S_a$ is a source term. This equation is very similar in form to the Navier-Stokes equation. Indeed, it includes an advection term, a diffusion term and a "force term" $S_a$. All these terms can be resolved in exactly the same manner as the velocity terms above. The dissipation term not present in the Navier-Stokes Equation is solved as follows over a time-step:

$$a(x,t+\Delta t) = (1-\Delta t\alpha_a)a(x,t).$$

Similar equations were used by Stam and Fiume to simulate fire and other gaseous phenomena (Stam, J. and Fiume, E., "Depicting Fire and Other Gaseous Phenomena Using Diffusion Processes", supra). However, their velocity fields were not computed dynamically and the temperature had no effect on their fields. Notice also that a model for the propagation of substances in the fluid was not present in Foster and Metaxas' model.

III. An Embodiment of the Navier-Stokes Solution Method

The following describes an embodiment of the above solution to the Navier-Stokes equations. The solution is described in terms of software routines, but may be performed in hardware, or in some combination of software and hardware.

A. Program Structure

In the embodiment described herein, fluids are modeled by their velocity and their temperature. The propagation by the fluid of any number of substances (like smoke, vapour or dust) is modeled by the density of the substance. Each quantity, i.e., velocity, temperature, and density, is defined on either a two-dimensional (NDIM=2) or three-dimensional (NDIM=3) grid, depending on the application. The grid is defined by its physical dimensions: origin O[NDIM] and length L[NDIM] of each side, and by its number of cells N[NDIM] in each coordinate. This in turn determines the size of each voxel D[i]=L[i]/N[i]. The definition of the grid is a program input that is specified by the person creating the animation. The velocity and the temperature are defined at the center of each cell as shown in FIGS. 4A and 4B. FIG. 4A represents a grid used in a two-dimensional simulation; FIG. 4B represents a grid used in a three-dimensional simulation. Two grids are allocated for each component of the velocity: U0[NDIM] and U1[NDIM], and similarly for the temperature field, T0[NDIM] and T1[NDIM]. Two additional grids are allocate to hold the density of substances like smoke and water vapor, which are animated by the flow. This density is likewise stored in two grids S0 and S1. Although this implementation can handle any number of substances, for the sake of clarity only the routine for the density field of a single substance is presented in this section. At each time step of the simulation one grid in each grid pair corresponds to the solution obtained in the previous step, while the new solution is stored in the second grid. After each step, the paired grids are swapped. The speed of interactivity is controlled by a single time step dt, which can be as large as the animator wishes, since the solver is stable. Notice that the time step used during the interactive session may be different from the time step used to create the final animation, which is typically the frame rate of 1/30 seconds. The temperature of the fluid is affected by a viscosity visc, a constant of thermal diffusion kT and the rate of thermal dissipation aT. Small values of the viscosity correspond to slowly moving fluids such as glue, while large values of the viscosity correspond to more turbulent rotational fluids. The parameters for the temperature control how fast the temperature diffuses and dissipates over time. The density of a substance is likewise modeled by a diffusion constant kS and a dissipation rate aS.

Along with these parameters, the animator also must specify the values of these fields on the boundary of the grid. There are basically two types: periodic or fixed. The boundary conditions can be of a different type for each coordinate. When periodic boundary conditions are chosen, the fluid wraps around. This means that a piece of fluid which leaves the grid on one side reenters the grid on the opposite side. In the case of fixed boundaries the value of each physical quantity has to be specified at the boundary of the grid. The simplest is to set the field to zero at the boundary. Foster and Metaxas' paper contains an excellent description of different boundary conditions and their resulting effects. For the special case when the boundary conditions are periodic in each coordinate, a very elegant solver based on the fast Fourier transform can be employed. This solver is described above in Section II.C. This description is not repeated here since the solver in this section is more general and can handle both types of boundary conditions.

The fluid can be set into motion by several means. External forces or heat sources can be hardcoded for a special effect, or the animator can specify them interactively using a graphical user interface. In an embodiment of the invention, an animation system permits the animator, with the aid of the mouse, to apply directional forces to the fluid and apply heat at some points of the grid. The maximum values for the applied force, heat, and density are modeled by the parameters Vmax, Tmax, and Smax, respectively.

B. The Navier-Stokes Solver

The solver as described herein comprises a separate library of routines. In an embodiment of the invention, these routines are called by the interactive animation system. The two main routines of this library update either the velocity field Vstep or a scalar field Sstep over a given time step. The scalar routine is used to update both the temperature field and the density of the substance present in the field. The external force is given by an array of vectors F[NDIM], and the sources for heat and density are given by the arrays Tsource[NDIM] and Ssource[NDIM], respectively. The general structure of the simulator logic is as follows:

while (simulating) {
/* get forces and sources */
Vstep (U1, U0, visc, T, Vmax, F, dt);
Sstep (T1, T0, kT, aT, U1, Tmax, Tsource, dt);
Sstep (S1, S0, kS, aS, U1, Smax, Ssource, dt);
Swap(U1, U0); Swap(T1, T0); Swap(S1, S0);

The velocity solver Vstep represents a means for solving Eq. 5. It includes a routine to account for buoyancy, which is then followed by four steps: the forces are added to the field, the field is advected by itself, the field diffuses due to viscous friction within the fluid, and in the final projection step, the velocity is forced to conserve mass. The general structure of this routine is:

Vstep (U1, U0, visc, T, Vmax, F, dt)
addBuoyancy (U0, T, dt);
/* each of the following three routines is called NDIM times */
addForce (U0[i], U0[i], F[i], dt);
Transport (U1[i], U0[i], U0, dt);
Diffuse (U0[i], U1[i], visc, dt);
Project (U1, U0, dt);

The routine addBuoyancy adds the effect of buoyancy due to the temperature to the velocity field (see Eq. 6 for a definition of this term). The addForce routine just adds the force field multiplied by the time step to each value of the field, and corresponds to the f term of Eq. 5.

The Transport routine is an important step in the simulation. It accounts for the movement of the temperature and the substance due to the velocity field. and corresponds to the advection term $-(u \cdot \nabla)u$ in Eq. 5. More importantly it is used to resolve the non-linear effect of the fluid moving itself. The general structure of this routine is Transport (S1, S0, U, dt)
for each cell (i, j, k) do
X=0+(i, j, k) D;
TraceParticle (X, U, −dt, X0);
S1[i, j, k]=LinInterp (X0, S0);
end The routine TraceParticle traces a path starting at X through the field U over a time −dt. The endpoint of this path is the new point X0. A second order Runge-Kutta (RK2) method is used for the particle trace (Press, W. H., et al., *Numerical Recipes in C. The Art of Scientific Computing,* Cambridge University Press, Cambridge (1988)). An adaptive particle tracer is implemented, which subsamples the time step only in regions of high velocity gradients, such as near object boundaries. The routine LinInterp linearly interpolates the value of the scalar field S at the location X0. Note that a higher order interpolation is not used, since this might lead to instabilities due to the oscillations and overshoots inherent in such interpolants. On the other hand, higher order spline approximants may be used, through these tend to smooth out the resulting flows.

To solve for the diffusion (Diffuse, corresponding to the $v\nabla^2 u$ term of Eq. 5) and to perform the projection (Project, the P operation of Eq. 5), a sparse linear solver SolveLin is needed. The best theoretical choice is the multi-grid process (Hackbusch, W., supra). However, a solver from FISHPAK library (available from the NETLIB software repository) is also suitable. The linear solver from FISHPAK is designed to solve a general system of finite difference equations of the type:

$$K1(S[i-1,j,k]-2S[i,j,k]+S[i+1,j,k])+K2(S[i,j-1,k]-2S[i,j,k]-S[i,j+1,k])+A[k]S[i,j,k-1]+B[k]S[i,j,k]+C[k]S[i,j,k+1]=F[i,j,k].$$

For the diffusion solver, the values of the constants on the left hand side are:

$$K1=-dt\,k/(D[0]D[0]),\ K2=-dt\,k/(D[1]D[1]),\ A[k]=C[k]=-dt\,k/(D[2]D[2])\text{ and }B[k]=1+2dt\,k/(D[2]D[2]).$$

while the right hand side is equal to the grid containing the previous solution: F=S0. In the projection step these constants are equal to $K1=1/(D[0]D[0])$, $K2=1/(D[1]D[1])$, $A[k]=C[k]=1/(D[2]D[2])$ and $B[k]=-2/(D[2]D[2])$.

while the right hand side is equal to the divergence of the velocity field:

$F[i,j,k]=0.5((U[i+1,j,k]-U[i-1,j,k])/D[0]+(U[i,j+1,k]-U[i,j-1,k])/D[1]+(U[i,j,k+1]-U[i,j,k-1])/D[2])$,

The gradient of the solution is then subtracted from the previous solution:

$U1[0][i,j,k]=U0[0][i,j,k]-0.5(S[i+1,j,k]-S[i-1,j,k])/D[0]$, $U1[1][i,j,k]=U0[1][i,j,k]-0.5(S[i,j+1,k]-S[i,j-1,k])/D[1]$, $U1[2][i,j,k]=U0[2][i,j,k]-0.5(S[i,j,k+1]-S[i,j,k-1])/D[2]$,

The FISHPAK routine is also able to handle different types of boundary conditions, both periodic and fixed.

The general structure of the scalar field solver is very similar to the velocity solver. It involves four steps: add the source, transport the field by the velocity, and diffuse and dissipate the field. The scalar field solver shares some of the routines called in the velocity solver:

Sstep (S1, S0, k, a, U, Smax, source, dt)

addForce (S0, S0, source, dt);

Transport (S1, S0, U, dt);

Diffuse (S0, S1, k, dt );

Dissipate (S1, S0, a, dt);

The dissipation routine Dissipate multiples each element of the first array by 1−dt*a and stores it in the new array.

IV. Other Areas of Applicability

While the above solver for the Navier-Stokes equations permits realistic simulation of fluid flow in a computer graphics animation, the solver can also be used for other applications.

In the special effects industry there is a high demand to convincingly represent the appearance and behavior of fluids such as smoke, water and fire. Paint programs can also benefit from fluid solvers to emulate traditional techniques such as watercolor and oil paint. Texture synthesis is another possible application. Indeed, many textures result from fluid-like processes, such as erosion. Finally, the modeling and simulation of fluids is of prime importance in most scientific disciplines and in engineering.

V. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for performing computer graphic simulation of a fluid in motion, the method comprising the steps of:

a. providing input data to a simulator module;

b. starting the simulated fluid in motion;

c. calculating a velocity value u of the fluid at a plurality of points in the simulated fluid, at a plurality of time intervals, wherein said calculation is performed by solving an equation $$\frac{\partial u}{\partial t} = P(-(u \cdot \nabla)u + v\nabla^2 u + f)$$

where

P projects a vector field onto its divergence-free part, v is a kinematic viscosity of the fluid, and f is a combination of external forces acting on the fluid and said equation is solved using implicit solvers and the method of characteristics;

d. sending said velocity values to a renderer module;

e. producing an animation based on all inputs to said renderer module; and f. displaying said animation on an output device.

2. The method of claim 1, wherein the simulation is performed in two dimensions.

3. The method of claim 1, wherein the simulation is performed in three dimensions.

4. The method of claim 1, wherein the input data of step (a) comprises:

(1) the definition of a grid, wherein said velocity is to be calculated at each cell of said grid and at each of said time intervals;

(2) the length of said time interval;

(3) the viscosity of the fluid; and (4) the velocity values at the boundaries of said grid.

5. The method of claim 1, wherein step (b) is performed by an animator.

6. The method of claim 1, wherein step (b) is performed by said simulator module.

7. The method of claim 1, wherein the calculation of step (c) incorporates, in the force term f, the effect of thermal buoyancy, $f_{buoy}$, in turn calculated according to the equation $$f_{buoy} = gz\left(\frac{T - T_0}{T_0} + \frac{p - p_0}{p_0}\right)$$

where g is the gravitational constant, z is a vertical unit vector,

T is a temperature of the fluid, $T_0$ is a temperature of the fluid at hydrostatic equilibrium, p is a pressure of the fluid, and $p_0$ is a pressure of the fluid at hydrostatic equilibrium.

8. The method of claim 1, further comprising the steps of (g) calculating a scalar value a at a plurality of points in the simulated fluid at a plurality of time intervals, wherein said scalar calculation is performed by solving an equation $$\frac{\partial a}{\partial t} = -u \cdot \nabla a + \kappa_a \nabla^2 - \alpha_a a + S_a,$$

where $\kappa_\alpha$ is a desired diffusion constant, $\alpha_\alpha$ is a desired dissipation rate, and $S_\alpha$ is a desired source term; and (h) sending said scalar values to said renderer module, which are performed after step (b) and before step (e), and where the input data of step (a) comprises (1) the definition of a grid, wherein said scalar is to be calculated at each cell of said grid and at each of said time intervals;
(2) the length of said time interval;
(3) the desired diffusion constant of the fluid;
(4) the desired dissipation rate of the fluid; and
(5) the said scalar values at the boundaries of said grid.

9. The method of claim 1, further comprising the steps of
(i) calculating the density value b of the fluid at a plurality of points in the fluid at a plurality of time intervals, wherein said density calculation is performed by solving the equation $$\frac{\partial b}{\partial t} = -u \cdot \nabla b + \kappa_b \nabla^2 - \alpha_b b + S_b,$$

where
$\kappa_b$ is a density diffusion constant,
$\alpha_b$ is a density dissipation rate, and
$S_b$ is a density source term and
(j) sending said density values to said renderer module,
are performed after step (b) and before step (e), and where the input data of step (a) comprises (1) the definition of a grid, wherein said density is to be calculated at each cell of said grid and at each of said time intervals;
(2) the length of said time interval;
(3) the density diffusion constant of a substance in the fluid;
(4) the density dissipation rate of said substance in the fluid; and
(5) the density values at the boundaries of said grid.

10. The method of claim 8, wherein said scalar value is temperature, said desired diffusion constant is a thermal diffusion constant, said desired dissipation rate is a thermal dissipation rate and said desired source term is a thermal source term.

11. The method of claim 8, wherein said scalar value is density, said desired diffusion constant is a density diffusion constant, said desired dissipation rate is a density dissipation rate and said desired source term is a density source term.

12. The method of claim 8, wherein said scalar value is texture, said desired diffusion constant is a texture diffusion constant, said desired dissipation rate is a texture dissipation rate and said desired source term is a texture source term.

* * * * *